United States Patent [19]
Prabhu et al.

[11] Patent Number: 6,103,798
[45] Date of Patent: Aug. 15, 2000

[54] POLYMER COMPOSITIONS CONTAINING HYDROCARBON AMINE OXIDES AND HYDROCARBON AMINE OXIDE STABILIZER COMPOSITIONS

[75] Inventors: Vaikunth S. Prabhu, Vienna; Roger W. Avakian, Parkersburg, both of W. Va.

[73] Assignee: General Electric Company, Pittsfield, Mass.

[21] Appl. No.: 09/085,378

[22] Filed: May 26, 1998

Related U.S. Application Data

[60] Division of application No. 08/717,313, Sep. 20, 1996, Pat. No. 5,844,029, which is a continuation-in-part of application No. 08/533,134, Sep. 25, 1995, abandoned.

[51] Int. Cl.$^7$ ....................................................... C08K 5/17
[52] U.S. Cl. .......................... 524/236; 524/217; 524/238; 524/239; 524/241; 524/242; 524/543; 524/551; 524/560; 524/568; 524/602; 524/604; 524/605; 524/609; 524/611; 524/612; 524/173
[58] Field of Search ....................................... 524/236, 173, 524/217, 238, 239, 241, 242, 543, 551, 560, 568, 602, 604, 605, 609, 611, 612

[56] References Cited

U.S. PATENT DOCUMENTS 5,844,029 12/1998 Prabhu et al. ............................ 524/236

*Primary Examiner*—Kriellion Sanders

[57] ABSTRACT

Thermoplastic compositions are provided containing a saturated hydrocarbon amine oxide and stabilizer compositions are provided containing a saturated hydrocarbon amine oxide and a second stabilizer. The thermoplastic compositions exhibit good melt flow rate stability during processing and are useful for making molded and extruded articles. The stabilizer compositions are useful for addition to thermoplastics for the stabilization thereof. A method is also provided for stabilizing thermoplastic compositions and involves admixing a hydrocarbon amine oxide with a thermoplastic resin. The saturated hydrocarbon amine oxides are preferably trialkyl amine oxides. The thermoplastic resin is preferably a polyolefin resin.

25 Claims, No Drawings

POLYMER COMPOSITIONS CONTAINING HYDROCARBON AMINE OXIDES AND HYDROCARBON AMINE OXIDE STABILIZER COMPOSITIONS

This is a divisional of application Ser. No. 08/717,313, filed Sep. 20, 1996, now U.S. Pat. No. 5,844,029 which is a continuation in part of Ser. No. 08/533,134 filed on Sep. 25, 1995.

BACKGROUND OF THE INVENTION

1. Field of the Invention

The present invention relates to thermoplastic compositions, and stabilizers for thermoplastic compositions, and more particularly relates to stabilized thermoplastic compositions and stabilizer concentrates for thermoplastic compositions.

2. Description of the Related Art

Trialkyl amine oxides are generally known, and the use of such has an additive for products such as shampoos, soaps, fabric softeners, cleaners, detergents, gasolines, agricultural formulation, deodorant sticks, and cellulose extrusion products is also known.

The need for stabilization of polymeric compositions is also known, and the use of compounds such as hydroxyl amines, hindered phenolics, and phosphites is also generally known. For example, U.S. Pat. No. 4,403,053 discloses stabilization of polyolefins with a benzotriazole and a phosphite, and U.S. Pat. No. 4,305,866, discloses stabilization of polyolefin with the phosphite. As a further example, U.S. Pat. No. 4,443,572 discloses stabilization of polyolefins with a phosphite, hindered phenol and thioester. As also shown above, the use of hydroxyl amines is also known, for example, the use of hydroxyl amine of the formula

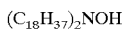

$(C_{18}H_{37})_2NOH$ is known for stabilization of thermoplastic compositions such as polyolefins. Furthermore, unsaturated compounds of the general structure

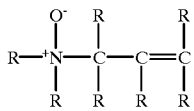

are known as process stabilizers, see Odorisio et al., U.S. Pat. No. 5,268,114, incorporated herein by reference. It is believed that the unsaturation adds undesirable qualities to the manufacturing process for the making thereof.

Accordingly, there is a need and desire to provide polymer compositions which exhibit desired levels of stability and to provide stabilizer compositions for incorporation into polymer compositions.

SUMMARY OF THE INVENTION

The present invention involves thermoplastic compositions containing saturated hydrocarbon amine oxides and stabilizer compositions containing saturated hydrocarbon amine oxides. The thermoplastic compositions may optionally contain at least one additional stabilizers. The additional stabilizer is selected from the group consisting of phosphites, hindered phenolics, and hindered amines.

The stabilized compositions exhibit low levels of melt flow rate increases upon extended extrusion passes. Preferably the polymer compositions contain a polyolefin resin.

DETAILED DESCRIPTION OF THE INVENTION

The thermoplastic compositions comprise a thermoplastic resin and a hydrocarbon amine oxide. Preferably the thermoplastic resin is present at a level of between 50 and 99.99 percent by weight based on the total weight of the composition, more preferably between 80 and 99.9 percent by weight, and most preferably between 95 and 99 percent by weight thereof; and preferably the saturated hydrocarbon amine oxide is present at a level of from 0.001 and 5 percent by weight based on the total weight of the composition, more preferably between 0.005 and 1 percent by weight based on the total weight of the composition, and most preferably between 0.05 and 0.1 percent by weight thereof. Preferably the thermoplastic compositions further contain a neutralizer, for example, a metal salt of a fatty acid such as calcium stearate, at a level of from 100 parts per million to 2000 parts per million based on the total weight of the thermoplastic resin. The thermoplastic composition may further contain amounts of other stabilizers or may be free from them.

The saturated hydrocarbon amine oxide stabilizer compositions are preferably in the form of stabilizer blends containing respective amounts of the hydrocarbon amine oxide and a second stabilizer. Preferably, the second stabilizer is selected from the group consisting of phosphites, hindered phenolics, hindered amines, and mixtures thereof. Preferably, the hydrocarbon amine oxide and the second stabilizer are present in respective weight ratios of between 1:99 and 99:1, more preferably between 5:95 and 95:5, and most preferably between 25:75 and 75:25 on a respective weight ratio basis. Preferably the stabilizer composition contains a hydrocarbon amine oxide at a level of between 1 and 99 percent by weight based on the total weight of the stabilizer 5 composition, more preferably between 5 and 95 percent by weight thereof, and most preferably between 25 and 75 percent by weight thereof; and the second stabilizer is preferably present at a level of from 1 to 99 percent by weight based on the total weight of the stabilizer composition, more preferably between 5 and 95 percent by weight thereof, and most preferably between 25 and 75 percent by weight thereof.

Amine oxides and processes for making thereof are set out in Richard J. Nadolsky Amine Oxides Encyclopedia of Chemical Technology, Vol. 2, pages 259–271, John Wiley & Sons, Inc. (1978), which is incorporated herein by reference.

The thermoplastic resin, also referred to as a polymer, may be any thermoplastic known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or may be made by means well known in the art. However, the hydrocarbon amine oxides and stabilizer compositions of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally platicized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide, 4,polyamide 6,polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

The resulting stabilized thermoplastic polymer compositions optionally also contain various conventional additives, such as the following:

1. Antioxidants 1.1 Alkylated mono-phenols, for example: 2,6-di-tert-butyl-4-methylphenol, 2-tert-butyl-4,6-dimethylphenol, 2,6-di-tert-butyly-4-methylphenol, 2,6-di-tert-butyl-4-n-butylphenol, 2,6-di-tert-butyl-4isobutylphenol, 2,6-dicyclopentyl-4-methylphenol, 2-(α-methylcyclohexyl)-4,6 dimethylphenol, 2,6-di-octadecyl-4-methylphenol, 2,4,6,-tricyclohexyphenol, 2,6-di-tert-butyl-4-methoxymethylphenol.

1.2 Alkylated hydroquinones, for example, 2,6di-tert-butyl-4-methoxyphenol, 2,5-di-tert-butylhydroquinone, 2,5di-tert-amyl-hydroquinone, 2,6diphenyl-4-octadecyloxyphenol.

1.3 Hydroxylated thiodiphenyl ethers, for example, 2,2'-thio-bis-(6-tert-butyl-4-methylphenol), 2,2'-thio-bis-(4-octylphenol), 4,4'-thio-bis-(6-tertbutyl-3-methylphenol), 4,4'-thio-bis-(6-tert-butyl-2-methylphenol).

1.4 Alkylidene-bisphenols, for example, 2,2'-methylene-bis-(6-tert-butyl-4-methylphenol), 2,2-methylene-bis-(6-tert-butyl-4-methylphenol), 2,2'-methylene-bis-(4methyl-6-(α-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4methylphenol), 2,2'-methylene-bis-(6-(α-methylbenzyl)4-nonylphenol), 2,2'-methylene-bis-(6-(α,α-dimethylbenzyl)4-nonyl-phenol). 2,2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane. 2,6-di-(3-tert-butyl-5-methyl-2-hydroxybenzyl)4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylphenyl)-dicyclopentadiene, di-(2-(3'-tert-butyl-2'hydroxy-5'methylbenzyl)-6-tert-butyl-4-methylphenyl) terephthalate, and other phenolics such as monoacrylate esters of bisphenols such as ethylidiene bis-2,4-di-t-butylphenol monoacrylate ester.

1.5 Benzyl compounds, for example, 1,3,5-tris-(3,5-di-tert-butyl-4-hydroxybenzyl)-2,4,6-trimethylbenzene, bis-(3, 5-di-tert-butyl-4-hydroxybenzyl)sulfide, isooctyl 3,5-di-tert-butyl-4-hydroxybenzyl-mercapto-acetate, bis-(4-tert-butyl-3hydroxy-2,6-dimethylbenzyl)dithiol-terephthalate. 1,3,5 -tris-(3,5-di-tert-butyl-4 10 hydroxybenzyl)isocyanurate. 1,3,5-tris-(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tertbutyl-4-hydroxybenzylphosphonate, 1,3,5-tris-(3,5-dicyclohexyl-4-hydroxybenzyl)isocyanurate.

1.6 Acylaminophenols, for example, 4hydroxy-4-lauric acid anilide, 4-hydroxy-stearic acid anilide, 2,4-bis-octylmercapto-6-(3,5-tert-butyl-4-hydroxyanilino)-s-triazine, octyl-N-(3,5-di-tert-butyl-4-hydroxyphenyl)-carbamate.

1.7 Esters of beta-(5-tert-butyl-4-hydroxy-3-methylphenyl) -propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thidiethyleneglycol, dihydroxyethyl oxalic acid diamide.

1.8 Amides of beta-(3,5-di-tert-butyl-4hydroxyphenol) -propionic acid for example, N,N'-di-(3,5-di-tert-butyl-4-hydroxyphenylpropionyl)-hexamethylendiamine, N,N'-di-(3,5-di-tert-butyl-4-hydroxyphenylpropionyl) trimethylenediamine, N,N'-di(3,5-di-tert-butyl-4-hydroxyphenylpropionyl)-hydrazine.

2. UV absorbers and light stabilizers.

2.1 2-(2'-hydroxyphenyl)-benzotriazoles, for example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-butyl-5'-tert-butyl-,4'-octoxy,3', 5'-ditert-amyl-3',5'-bis-(α, α-dimethylbenzyl)-derivatives.

2.2 2-Hydroxy-benzophenones, for example, the 4-hydroxy-4-methoxy-,4-octoxy,4-decyloxy-,4dodecyloxy-, 4-benzyloxy,4,2',4'-trihydroxy-and 2'-hydroxy-4,4'-dimethoxy derivative.

2.3 Esters of substituted and unsubstituted benzoic acids for example, phenyl salicylate, 4-tertbutylphenyl-salicilate, octylphenyl salicylate, dibenzoylresorcinol, bis-(4tert-butylbenzoyl)- resorcinol, benzoylresorcinol, 2,4-di-tert-butyl-phenyl-3,5-di-tert-butyl hydroxybenzoate and hexadecyl-3,5-ditert-butyl-4-hydroxybenzoate.

2.4 Acrylates, for example, α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyano-vinyl)-2-methyl-indoline.

2.5 Nickel compounds, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyldiethanolamine, nickel dibutyldithiocarbamate, nickel salts of 4hydroxy-3,5-di-tert-butylbenzylphosphonic acid monoalkyl esters, such as of the methyl, ethyl, or butyl ester, nickel complexes of ketoximes such as of 2-hydroxy-4-methylpenyl undecyl ketoxime, nickel complexes of 1-phenyl-4-lauroyl-5-hydroxypyrazole, optionally with additional ligands.

2.6 Sterically hindered amines, for example bis (2, 2, 6, 6-tetramethylpiperidyl)-sebacate, bis-5 (1,2,2,6, 6pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6-tetramethyl-4hydroxy-piperidine and succinic acid, condensation product of N,N'-(2,2,6, 6tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2, 2, 6, 6-tetramethyl-4-piperidyl)-1, 2,3, 4butane-tetra-carbonic acid, 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate: 1-hydroxy 2,2,6,6-tetramethyl-4-benzoxypiperidine; 1-hydroxy-2,2,6,6-tetramethyl-4(3,5-di-tert-butyl-4-hydroxy hydrocinnamoyloxy)-piperdine; and N-(1-hydroxy-2,2,6,6-tetramethyl-piperidin)-epsiloncaprolactam.

2.7 Oxalic acid diamides, for examples, 4,4'-di-octyloxy-oxanilide, 2,2'-di-octyloxy-5',5'-ditert-butyloxanilide, 2,2'- di-dodecyloxy-5',5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4di-tert-butyloxanilide and mixtures of ortho-and para-methoxy-as well as of o- and p-ethoxy-disubstituted oxanilides.

2.8 Hydroxyphenyl-s-triazines, for example 2,6-bis-(2,4-dimethylphenyl)-4-(2-hydroxy-4-octyloxyphenyl)-s-triazine, 2,6-bis(2,4-dimethylphenyl)-4-(2,4-dihydroxyphenyl)-s-triazine; 5 2,4-bis(2,4-dihydroxyphenyl)-6-(4-chlorophenyl)-s-triazine; 2,4-bis(2-hydroxy(2-hydroxyethoxy)phenyl)-6-(4-chlorophenyl)-s-triazine;2,4-bis(2hydroxy-4-(2-hydroxyethoxy)phenyl)-phenyl-s-triazine; 2,4-bis(2-hydroxy-4-(2-hydroxyethoxy)-phenyl)-6-(2,4-dimethylphenyl)-s-triazine; 2,4bis(2-hydroxy(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine, 2,4-bis(2,4-dihydroxyphenyl)-6 (2,4-dimethylphenyl)-1-s-triazine.

3. Metal deactivators, for example, N,N'diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-2-hydrazine, salicyloylamino-1,2,4-triazole, bis-benzyliden-oxalic acid dihydrazide.

4. Phosphites and phosphonites, for example, triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4di-tert-butylphenyl)phosphite, diisodecyl pentaerythritol diphosphite, 2,4,6-tri-tert-butylphenyl-2-butyl-2-ethyl-1,3-propanediol phosphite, bis(2,4-di-tert-butylphenyl) pentaerythritol diphosphite tristearyl sorbitol triphosphite, and tetrakis(2,4di-tert-butylphenyl)4,4'-biphenylene diphosphonite.

5. Peroxide scavengers, for example, esters of betathiodipropionic acid, for example the lauryl, stearyl, myristyl or tridecyl esters, mercaptobenzimidazole or the zinc salt of 2-mercaptobenzimidazole, zinc-dibutyldithiocarbamate, dioctadecyldisulfide, pentaerythritoltetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octadecyl-α-heptadecylnitrone, N-hexadecyl-α-heptadecyl nitrone, N-octadecyl-α-pentadecyl nitrone, N-heptadecyl-α-heptadecyl nitrone, N-octadecyl-α-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, Na ricinoleate and K palmitate, antimony pyrocatecholate or zinc pyrocatecholate, including neutralizers such as hydrotalcites and synthetic hydrotalcites, and Li, Na, Mg, Ca, Al hydroxy carbonates.

10. Nucleating agents, for example, 4tert-butylbenzoic acid, adipic acid, diphenylacetic acid, sodium salt of methylene bis-2,4-dibutylphenyl, cyclic phosphate esters, sorbitol tris-benzaldehyde acetal, and sodium salt of bis(2,4-di-t-butylphenyl) phosphate or Na salt of ethylidene bis(2,4di-t-butyl phenyl)phosphate.

11. Fillers and reinforcing agents, for example, calcium carbonate, silicates, glass fibers, asbestos, talc, kaolin, nica, barium sulfate, metal oxides and hydroxides, carbon black and graphite.

12. Other additives, for example, plasticizers, epoxidized vegetable oils, such as epoxidized soybean oils, lubricants, emulsifiers, pigments, optical brighteners, flameproofing agents, anti-static agents, blowing agents and thiosynergists such as dilaurythiodipropionate or distearylthiodipropionate.

The amine oxide is preferably a saturated tertiary amine oxide as represented by general formula (I):

(I)

wherein $R_1$ and $R_2$ are independently each a $C_6$ to $C_{36}$ residue that may optionally contain at least one —O—, —S—, —SO—, —CO$_2$—, —CO—, or —CON— moiety. $R_3$ is a $C_1$ to $C_{36}$ residue that may also optionally and independently contain at least one —O—, —S—, —SO—, —CO$_2$—, —CO—, or —CON— moiety. Included in the residues for $R_1$, $R_2$, and $R_3$ are benzyl and substituted benzyl residues. It is also possible for each of $R_1$, $R_2$, and $R_3$ to be the same residue. $R_1$ and $R_2$ are preferably $C_8$ to $C_{26}$ residues and most preferably $C_{10}$ to $C_{26}$ residues and $R_3$ is preferably $C_1$ to $C_{22}$ residues and most preferably a $C_1$ residue (e.g., methyl). Also, preferred amine oxides include those wherein $R_1$, $R_2$, and $R_3$ are the same $C_6$ to $C_{36}$ residues. Preferably, all of the aforementioned residues for $R_1$, $R_2$, and $R_3$ are saturated hydrocarbon residues or saturated hydrocarbon residues containing at least one of the aforementioned —O—, —S—, —SO—, —CO$_2$—, —CO—, or —CON— moieties. Those skilled in the art will be able to envision other useful residues for each of $R_1$, $R_2$, and $R_3$ without detracting from the present invention.

The saturated amine oxide of the present invention also includes poly(amine oxides). By poly(amine oxide) is meant tertiary amine oxides containing at least two tertiary amine oxides per molecule. Illustrative poly(amine oxides) (also called "poly(tertiary amine oxides)") include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles. Also included are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. Generally a useful number of amine oxide moieties in the overall thermoplastic resin is between about 0.001 weight percent and about 5 weight percent, based on the weight of the entire thermoplastic composition. All of the aforementioned amine oxides may optionally contain at least one —O—, —S—, —SO—, —CO$_2$—, —CO—, or —CON— moiety. In a preferred embodiment, each tertiary amine oxide of the polymeric tertiary amine oxide contains a $C_1$ residue.

In a preferred embodiment of the present invention, the saturated amine oxide is attached to a molecule containing a hindered amine. Hindered amines are known in the art and the amine oxide of the present invention may be attached to the hindered amine in any manner and structural position of the hindered amine. Useful hindered amines in the present invention include those of the general formulas (II) and (III):

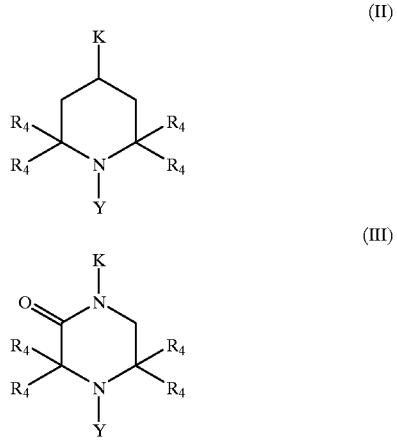

wherein K is a carbon chain containing the amine oxide (or amine oxides), Y is a $C_{1-30}$ alkyl moiety, a —C(O)R moiety wherein R is a $C_{1-30}$ alkyl group, or a OR moiety wherein R is a $C_{1-30}$ alkyl group, and each $R_4$ is independently a $C_{1-30}$ alkyl group, preferably a methyl group. Also included are amine oxides containing more than one hindered amine and more than one saturated amine oxide per molecule. The hindered amine may be attached to a poly(tertiary amine oxide) or attached to a polymeric substrate, as discussed above.

Also included in the present invention are thermal reaction products of tertiary amine oxides. Under elevated temperatures, e.g., such as those useful to prepare the thermoplastic compositions of the present invention, amine oxides including those illustrated by Formula I, are believed to undergo various reactions. The reactions are believed to result in the formation of various products, for example, hydroxyl amines and olefinic species. Amine oxide reaction products containing at least one long chain carbon residue are preferred in order to increase the solubility of the reaction products, including the hydroxyl amine-type reaction products, with the thermoplastic resin. When only a single alkyl substituent (i.e., only one of $R_1$, $R_2$, and $R_3$) in the tertiary amine oxide is a $C_6$ to $C_{36}$ residue and the other two alkyl substituents are $C_{1-5}$ residues, some of the hydroxyl amine-type reaction products are believed to contain only short chain substituents (i.e., $C_{1-5}$ residues). It is believed that this is a result of some of the long chain residues being eliminated from the amine oxide as an olefinic by-product. In order to insure that at least one long chain is retained in the hydroxyl amine-type thermal reaction products, either all three substituents should preferably be long chain or one chain can be $C_1$ (e.g., methyl) and the other two substituents be long chain (e.g., $C_6$ to $C_{36}$ residues). When one substituent is a $C_1$ residue and the other two substituents are long chain residues (including polymeric residues as previously described), the resultant thermal reaction product will be asymmetrical and contain a $C_1$ residue and a long chain residue. By long chain carbon residue is meant from $C_6$ to about $C_{36}$, preferably from $C_8$ to $C_{26}$ and most preferably $C_{10}$ to $C_{22}$. Also included by long chain residue are the before mentioned polymeric amine oxide residues. The long chain carbon residue may also optionally contain at least one of the before mentioned —O—, —S—, —SO—, —CO$_2$—, —CO—, or —CON— moieties described for $R_1$, $R_2$, and $R_3$. Hydroxyl amines-type reaction products that do not contain the aforementioned long chain residue tend to migrate out of the thermoplastic resin and can bloom to the surface of the thermoplastic resin or coat the surface of the processing equipment requiring costly downtime for cleaning and maintenance. It should be clear from the foregoing that the present invention includes hydroxyl amines containing at least one long chain carbon residue, preferably asymmetrical hydroxyl amines containing a long chain and a short chain; and also include polymeric hydroxyl amines containing at least two hydroxyl amines per molecule.

Preferred saturated amine oxides for use in the present invention include dioctylmethyl amine oxide, trioctyl amine oxide, didecylmethyl amine oxide, tridecyl amine oxide, di(coco alkyl) methyl amine oxide, tri(coco alkyl) amine oxide, di(tallow alkyl) methyl amine oxide, tri(tallow alkyl) amine oxide, tri($C_{20}$–$C_{22}$) amine oxide, and di($C_{20}$–$C_{22}$ alkyl) methyl amine oxide. Preferred saturated hydroxyl amines include octyl methyl hydroxyl amine, decyl methyl hydroxyl amine, (coco alkyl) methyl hydroxyl amine, (tallow alkyl) methyl hydroxyl amine, and ($C_{20}$–$C_{22}$ alkyl) methyl hydroxyl amine. By the term "coco alkyl" is meant hydrogenated $C_{12}$–$C_{14}$ alkyl commonly referred to as hydrogenated coconut oil. By the term "tallow alkyl" is meant hydrogenated $C_{16}$–$C_{18}$ alkyl commonly referred to as hydrogenated tallow oil. Hydrogenated tallow oil is described in U.S. Pat. No. 4,876,300. The aforementioned hydrogenated coconut no oil and hydrogenated tallow oil do contain some percentage of higher and/or lower carbon chain lengths than are described above and it should be understood that these other fractions are within the scope of the present invention. It is preferred that at least 75% of the carbon chains be within the described ranges for the coconut oil and tallow oil.

The amine oxide and any reaction products thereof are preferably present in an amount effective to improve the melt stability and/or the yellowness index of a thermoplastic composition. The amount is generally less than about 5 weight percent based on the weight of the thermoplastic resin, preferably less than about 1000 ppm based on the weight of the thermoplastic resin, and is even more preferably between about 950 ppm and about 5 ppm based on the weight of the thermoplastic resin.

It should be clear that the present invention includes a thermoplastic resin composition comprising a thermoplastic resin, and an amine oxide present at a level of from 0.001 to 5 percent by weight, based on the total weight of the composition, wherein the amine oxide has the structural formula (I):

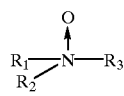

wherein $R_1$, $R_2$, and $R_3$ are independently selected from alkyl, aryl, aralkyl, alkaryl, cycloalkyl, alkcycloalkyl and cycloalkalkyl and each have from 1 to 36 carbon atoms per group, provided that if one of $R_1$, $R_2$ and $R_3$ is an alkyl group having from 6 to 36 carbon atoms per group, then the other two of $R_1$, $R_2$ and $R_3$ cannot both be alkyl groups having from 1 to 5 carbon atoms per group. It should also be clear that the present invention includes a method for stabilizing a thermoplastic resin, said method comprising: admixing an amine oxide with the thermoplastic resin, said amine oxide having the structural formula (I):

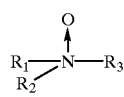

wherein $R_1$, $R_2$, and $R_3$ are independently selected from alkyl, aryl, aralkyl, alkaryl, cycloalkyl, alkcycloalkyl and cycloalkalkyl and each have from 1 to 36 carbon atoms per group, provided that if one of $R_1$, $R_2$ and $R_3$ is an alkyl group having from 6 to 36 carbon atoms per group, then the other two of $R_1$, $R_2$ and $R_3$ cannot both be alkyl groups having from 1 to 5 carbon atoms per group.

The present invention further involves the preparation of an amine oxide concentrate by admixing the amine oxide with a thermoplastic resin such as polyolefin (such as polypropylene) to produce a concentrate comprising from 5 to 50 percent amine oxide and from 50 to 95 percent thermoplastic resin based on the total weight of the concentrate. The concentrate may then be blended with a thermoplastic material for stabilization thereof. The concentrate has the advantages of ease of handling and reduced water absorbence under storage conditions compared to the amine oxide above. The concentrate may further comprise from 1 to 40 percent by weight of a stabilizer selected from phenolic antioxidants, hindered amine light stabilizers, ultraviolet light absorbers, organic phosphorus compounds, alkaline metal salts of fatty acids, and thiosynergists.

The thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids, and thiosynergists. The amine oxide may be used in thermoplastic compositions exposed to combustion products of natural gas, and medical articles exposed to gamma irradiation for sterilization.

The amine oxides may also be useful in thermoset resin compositions such as polyurethanes (such as SPANDEX resin), epoxides, melamine, and phenolics; and may be useful in thermoset/plastic blends, and may be present at the levels set out above for thermoplastic resin compositions.

Other amine oxides include dihydroxyethyl cocamine oxides, dihydroxyethyltallowamine oxides, cocamine oxides, palmitamine oxides, and hydrogenerated tallowamine oxides and these may contain up to 25 percent by weight water. Amine oxides are typically hygroscopic, and as a result, may have an amount of water absorbed present therewith.

It should be clear that all patents herein are incorporated by reference.

EXAMPLES

Process stabilization of polypropylene at 500° F. (260° C.). The base formulation (BASE) comprises 100 parts of unstabilized polypropylene (Profax 6501, Montell) with 0.05 parts of calcium stearate. The test stabilizer was blended/mixed with the resin using Turbula Blender for 30 minutes. The test stabilizer, if liquid, was preblended with a portion of a resin which was then subsequently blended with the resin and mixed well using Turbula Blender. The stabilized resin formulation was extruded at 100 rpm from a 1 inch (2.54 cm) diameter extruder at 500° F. (260° C.) (Killion extruder).

After each of the first, third and fifth extrusions, resin pellets were compression molded 5 into 125 mil (3.2 mm) thick plaques at 370° F. (188° C.) and specimen yellowness index (YI) was determined. Low YI values indicate less yellowing. Additionally, the melt flow rate (in grams/10 minutes) was measured (ASTM-D-1238) on the pellets after the first, third and fifth extrusions. The closer the melt flow rate after the fifth extrusion is to the melt flow rate after the first extrusion indicates the superior process stabilization of polypropylene. Note the unexpected and surprisingly superior melt flow stability achieved by Stab 1 prepared to the other saturated amine oxides.

TABLE 1

| | | MFR (g/10 min) | | | YI | | |
|---|---|---|---|---|---|---|---|
| Example | Stab. | Pass 1 | Pass 3 | Pass 5 | Pass 1 | Pass 3 | Pass 5 |
| A | Base | 16.9 | 92.3 | 182 | 1.93 | 1.97 | 2.38 |
| 1 | Stab 1 | 5.0 | 5.9 | 6.9 | 2.87 | 4.03 | 4.70 |
| 2 | Stab 2 | 7.6 | 10.2 | 14.6 | 2.76 | 3.69 | 4.19 |
| 3 | Stab 3 | 4.8 | 7.85 | 10.7 | 2.36 | 3.23 | 3.88 |
| 4 | Stab 4 | 4.95 | 7.3 | 8.8 | 3.45 | 5.06 | 5.79 |
| 5 | Stab 5 | 5.20 | 6.7 | 9.6 | 3.33 | 4.45 | 5.26 |
| 6 | Stab 6 | 4.80 | 6.3 | 8.8 | 3.19 | 4.87 | 5.25 |
| 7 | Stab 7 | 9.8 | 18.6 | 24.4 | 3.34 | 4.75 | 5.79 |

Stab 1 is $(C_{10}H_{21})_2N\rightarrow O(CH_3)$ Hydrated
Stab 2 is $(C_{12}H_{25})_3N\rightarrow O$ Hydrated
Stab 3 is $(C_{16}H_{33})_3N\rightarrow O$ Hydrated
Stab 4 is N,N-Dimethyl-1-tetradecanamine oxide dihydrate
Stab 5 is N,N-Dimethyl-1-hexadecanamine oxide dihydrate
Stab 6 is N,N-Dimethyl-1-octadecanamine oxide dihydrate
Stab 7 is N,N,N-tributylamine oxide hydrated The compositions contained 750 ppm of the respective stabilizer in polypropylene. values are for melt flow rates and yellowness index of the compositions after the first, third and fifth extrusion pass.

TABLE 2

| | | MFR (g/10 min) | | | YI | | |
|---|---|---|---|---|---|---|---|
| Example | Stab. | Pass 1 | Pass 3 | Pass 5 | Pass 1 | Pass 3 | Pass 5 |
| B | Control | 12.6 | 28.3 | 53.4 | 2.87 | 3.93 | 4.81 |
| 8 | Stab 8 | 5.4 | 8.1 | 11.1 | 2.8 | 4.4 | 5.8 |
| 9 | Stab 9 | 5.6 | 8.1 | 12.5 | 3.2 | 4.5 | 5.6 |
| 10 | Stab 10 | 6.0 | 8.5 | 12.0 | 2.8 | 3.8 | 4.7 |

Control contains 500 ppm of calcium stearate and 750 ppm of hindered phenol
Stab 8 is 750 ppm of didecyl methyl amine oxide and 500 ppm of calcium stearate Stab 9 is 750 ppm of di(coco alkyl) methyl amine oxide and 500 ppm of calcium stearate Stab 10 is 750 ppm of di(tallow alkyl) methyl amine oxide and 500 ppm of calcium stearate The compositions in Table 2 further illustrate the unexpected improvement in melt stability achieved with the addition of a tertiary amine oxide to a thermoplastic resin. The di(tallow alkyl) methyl amine oxide (Example 10) additionally and unexpected improvement in the yellow index (YI) over the other illustrative amine oxides and over a control not containing an amine oxide.

What is claimed is:

1. A method to improve the yellowness index, melt stability, or yellowness index and melt stability of a thermoplastic resin, said method comprising:

admixing a thermal decomposition product of an amine oxide with the thermoplastic resin, wherein said amine oxide is of the general formula:

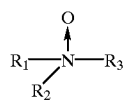

wherein $R_1$, $R_2$, and $R_3$ are independently selected from alkyl, aryl, aralkyl, alkaryl, cycloalkyl, alkcycloalkyl and cycloalkalkyl and each have from 1 to 36 carbon atoms per group, provided that if one of $R_1$, $R_2$ and $R_3$ is an alkyl group having from 6 to 36 carbon atoms per group, then the other two of $R_1$, $R_2$ and $R_3$ cannot both be alkyl groups having from 1 to 5 carbon atoms per group.

2. The method of claim 1, wherein said amine oxide has the structural formula:

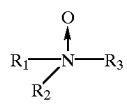

wherein $R_1$ and $R_2$ are independently each a $C_6$ to $C_{36}$ residue and $R_3$ is a $C_1$ to $C_{36}$ residue.

3. The amine oxide of claim 2, wherein $R_3$ is methyl.

4. The method of claim 1, wherein the amine oxide comprises didecyl methyl amine oxide.

5. The method of claim 1, wherein the amine oxide comprises di($C_{12}$–$C_{14}$ alkyl) methyl amine oxide.

6. The method of claim 1, wherein the amine oxide comprises di($C_{16}$–$C_{18}$ alkyl) methyl amine oxide.

7. The method of claim 1, wherein the amine oxide comprises di($C_{20}$–$C_{22}$ alkyl) methyl amine oxide.

8. The method of claim 1, wherein the amine oxide comprises tridecyl amine oxide.

9. The method of claim 1, wherein the amine oxide comprises tri($C_{12}$–$C_{14}$ alkyl) amine oxide.

10. The method of claim 1, wherein the amine oxide comprises tri($C_{16}$–$C_{18}$ alkyl) amine oxide.

11. The method of claim 1, wherein the amine oxide comprises tri($C_{20}$–$C_{22}$ alkyl) amine oxide.

12. The method of claim 1, wherein at least one of $R_1$, $R_2$, and $R_3$ comprises at least one moiety of the group consisting of —O—, —S—, —SO—, —$CO_2$—, —CO—, and —CON—.

13. The method of claim 1, wherein the amine oxide is a poly(amine oxide).

14. The method of claim 13, wherein the poly(amine oxide) comprises at least two tertiary amine oxides per molecule.

15. The method of claim 13, wherein the poly(amine oxide) comprises at least one moiety of the group consisting of —O—, —S—, —SO—, —$CO_2$—, —CO—, and —CON—.

16. The method of claim 14, wherein each tertiary amine oxide of the poly(amine oxide) contains a $C_1$ residue.

17. The method of claim 1, wherein the thermal decomposition product of the saturated amine oxide comprises a hindered amine.

18. The method of claim 1, wherein said amine oxide comprises a hindered amine.

19. The method of claim 1, further comprising admixing with the thermoplastic resin a stabilizer or mixture of stabilizers selected from phenolic antioxidants, hindered amine light stabilizers, ultraviolet light absorbers, organic phosphorus compounds, alkaline metal salts of fatty acids, and thiosynergists.

20. The method of claim 1, said method further comprising admixing with the thermoplastic resin an alkaline metal salt of a fatty acid.

21. The method of claim 20, wherein said alkaline metal salt of a fatty acid is calcium stearate.

22. The method of claim 1, wherein the thermoplastic resin is a polyolefin resin.

23. The method of claim 22, wherein the polyolefin resin is a polypropylene or a polyethylene resin.

24. The method of claim 1, wherein the method comprises extrusion of the thermal decomposition product of the amine oxide with the thermoplastic resin.

25. The method of claim 1, wherein the thermoplastic resin is at least on resin selected from the group consisting of polyesters, polyurethanes, polyalkylene terephthalates, polysulfones, polyimides, polyphenylene ethers, styrenic polymers, polycarbonates, acrylic polymers, polyamides, polyacetals, polyvinyl chloride, and polyolefin homopolymers and copolymers.

* * * * *